Oct. 23, 1956 M. ALDEN 2,768,050
ELECTRICAL SIGNAL RECORDING
Filed Feb. 25, 1950 3 Sheets-Sheet 1

Inventor
Milton Alden
by Roberts, Cushman & Grover
att'ys.

Oct. 23, 1956 M. ALDEN 2,768,050

ELECTRICAL SIGNAL RECORDING

Filed Feb. 25, 1950 3 Sheets-Sheet 2

Inventor
Milton Alden
by Roberts, Cushman & Grover
att'ys

Oct. 23, 1956 M. ALDEN 2,768,050

ELECTRICAL SIGNAL RECORDING

Filed Feb. 25, 1950 3 Sheets-Sheet 3

Inventor
Milton Alden
by Roberts, Cushman & Grover
attys.

United States Patent Office 2,768,050

Patented Oct. 23, 1956

2,768,050

ELECTRICAL SIGNAL RECORDING

Milton Alden, Wellesley, Mass.

Application February 25, 1950, Serial No. 146,167

24 Claims. (Cl. 346—33)

This invention relates to the art of recording data upon a traveling sheet or web by means of a recorder which makes a record upon such sheet or web along successive lines extending transversely of the direction in which the web travels in response to input signals applied to the recording or marking elements of the recorder as was described in my copending application Serial No. 577,755 filed February 14, 1945, of which the present application is a continuation in part. Depending upon the type of recording medium employed such recording being made for example by a controlled spray of ink vapor, by a heated marking element, photographically, electrically or by other well known means. While there are several types of recorders of this general type by way of example, one type involves a marking element such as a stylus which may travel back and forth across a flat web or may revolve about an axis which also is the center of curvature about which the web is semicircularly arranged. In another type one of the marking elements is an electrode in the form of a conductor wound helically about the periphery of an insulating drum so that the point of the conductor nearest the web travels transversely thereof as the drum is rotated about an axis adjacent to and transversely parallel to the web. In any case the effective recording point of the marking element travels transversely either back and forth or always in the same direction.

Objects of the present invention are to provide a method and apparatus which makes possible the simultaneous recording of two or more input signals by the same recorder, which makes possible the simultaneous recording of an unknown input signal and the calibration therefor, which permits the simultaneous recording of an input signal and predetermined information either in selected or random positions upon the recorder web and which advance the recording art generally.

In a broad aspect the invention contemplates the method of simultaneously recording two or more signals which comprises the steps of transforming by any of the well known transducers the input signals which may be the same or different phenomena into physical quantities, for example an electric curent having suitable characteristics to operate a recording element or elements of a recorder which may be any of the well known types such as those recorders mentioned above.

One of the physical quantities is applied to the recording element which is moved with respect to the web to provide a time axis for the physical quantity being recorded. The second physical quantity is then applied to the same element, which second quantity may but is not necessarily synchronized or otherwise correlated with either the rate of the recording paper web past the element or with the rate of element movement so that the record thereof appears at a selected location upon the web. It is also possible to vary one or both of the physical quantities by a predetermined pattern created for example by a switching mechanism which may be mechanical, photoelectric, magnetic, electronic or any of the other analogous well known devices thereby to record predetermined data upon the web of paper or other recording medium.

In another broad aspect the invention contemplates a recorder of the type having a mechanism for feeding a recording paper between two electrodes one of which is preferably helically shaped and the other electrode having a substantially straight edge disposed transversely of the paper and parallel to the axis of the helix, although electrodes having different arrangements such as those discussed heretofore may be used. Means are provided for moving one electrode with respect to the other, which in the case of the helical electrode is rotated about the axis of the helix, so that the trace is an essentially straight line substantially transverse to the direction of the paper feed. Means are connected to the same electrodes for applying a supplementary potential as a second signal applied simultaneously in timed relationship with respect to the first signal, which means may be, but is not necessarily synchronized with either the driving means for the movable electrode or with the web feeding mechanism so that data is marked in predetermined locations upon the web.

In a more specific aspect one of the input signals may be that of a signal which is a function of an unknown variant of for example, a physical phenomenon such as the frequency or amplitude of an incoming electromagnetic wave; the other signal being that of a known comparative standard whose source may be entirely separate from the recorder and associated equipment or may be incorporated as an element of the recorder, the calibrating signal being obtained for example from a switching device such as a commutator operated in synchronism with the helix or other moving electrode. It is also possible by synchronizing the operation of a second switching device with the rate at which the paper web or other recording medium is fed past the electrodes, to obtain a supplementary record representing time measurements which is applied periodically to the web of paper. It will be apparent, that calibration and time records applied to the paper web during the period that the record of the unknown signal is being received, results in such records being substantially independent of errors introduced by shrinking of the paper, variations in speed of the paper feeding mechanism and lateral wandering of the paper in the recorder.

In another specific aspect more elaborate switching mechanism of the type having a "memory" are used, for example a magnetized or perforated tape or drum, a tape or drum having contrasting marks thereupon detectable by a photoelectric cell, a commutator having unequally spaced segments or other devices which can be used to vary an electrical current or potential according to a predetermined pattern. The proper time spacing of the variations will, when such variations are applied to the electrode of a recorder, produce symbols, letters, numbers and other indicia upon the recording medium. By synchronizing the switching device with either the paper feed mechanism or the drive of the movable electrode such indicia may be positioned at selected locations upon the recording paper.

These and other objects and aspects will be apparent from the following description of illustrative embodiments of the invention, referring to drawings in which.

Figure 1:
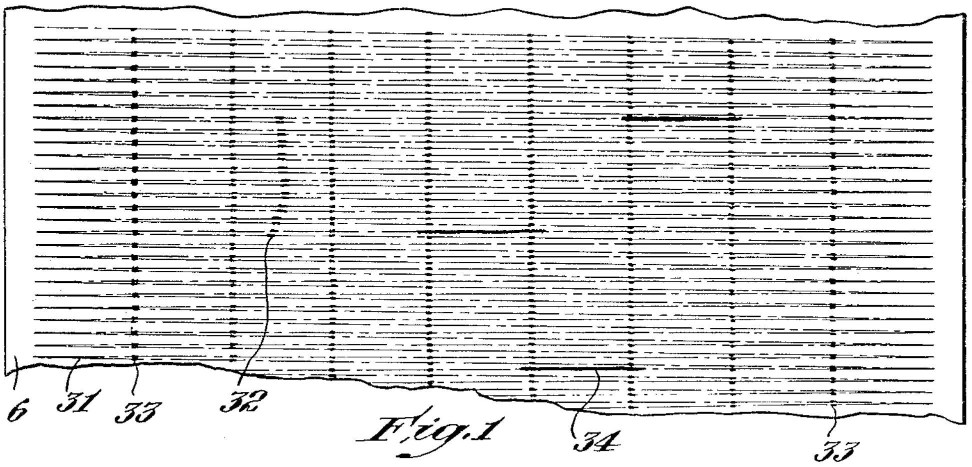
Fig. 1 is a face view of a record sheet showing the record of the variations of an input signal and the calibration and timing records therefor.

The first embodiment of the invention chosen for the purpose of illustration is a ceilometer for measuring and recording the altitude of clouds, wherein 1 (Fig. 3) designates a source of electro-magnetic radiation such as the searchlight for throwing a spot of light on a cloud such as indicated at 2, and 3 is a photoelectric cell which is rotated back and forth through an arc of 90° in the vertical plane of the beam of light. Thus during each movement back and forth the photoelectric cell 3 receives an impulse from the light reflected from the spot at an angle in its arc of oscillation which is a function of the altitude of the cloud 2 above the cell.

The recorder (Fig. 2) for making a continuous record of such angle comprises two marking elements or electrodes, one of which is in the form of a printer bar or plate 4 having a substantially straight edge adjacent one side of a web or sheet 6 of electrosensitive paper. Adjacent the opposite side of the sheet 6 is a drum 7 of insulating material carrying the second marking electrode which is a helical conductor 8, the record sheet being fed between the bar 4 and drum by means of feed rolls 9 and 11 driven by an electric motor 28. When the photoelectric cell 3 receives a reflected light impulse from the cloud 2, it transmits an electrical signal through conductors 12, thence through the usual amplifying and rectifying means (not shown) to conductors 13, 14 and 16 to the recorder marking electrodes 4 and 8. The signal current flowing through the paper between the electrodes 4 and 8 makes a trace on the paper at a location depending upon the point of the helix 8 which is adjacent the bar 4 at the moment.

Figure 2:
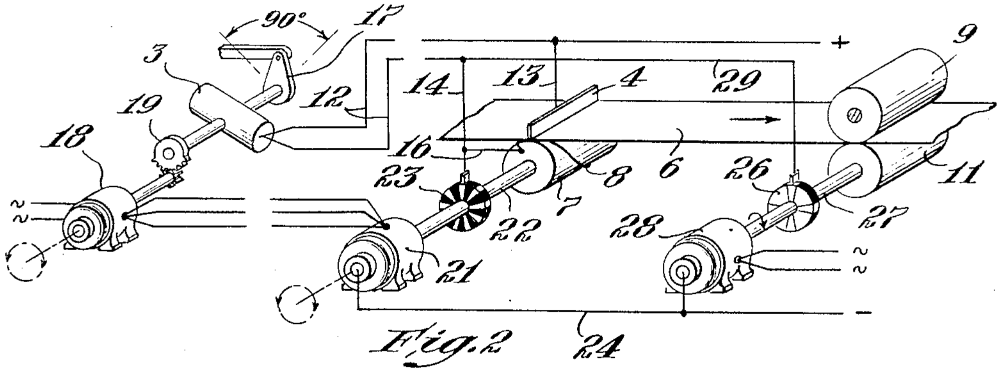
Fig. 2 is a diagrammatic view showing the wiring of receiving, recording and synchronizing apparatus for applying the records to the sheet shown in Fig. 1.
Figure 3:
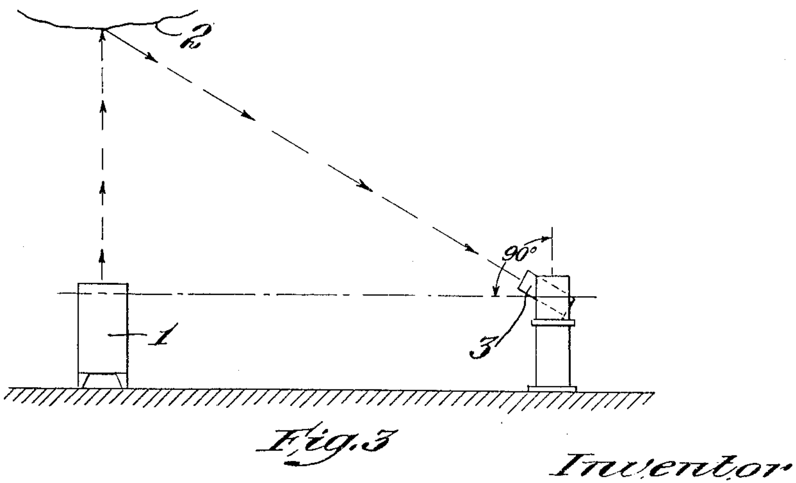
Fig. 3 is a diagrammatic view of the physical arrangements of the apparatus shown in Fig. 2.

As indicated diagrammatically by the crank 17 in Fig. 2 the cell 3 is oscillated back and forth through 90°, and as indicated in the same figure a Selsyn transmitter or controller 18 is connected with the cell through a suitable mechanical coupling 19. For simplicity of illustration the coupling is shown as having a one-to-four gear ratio so that the armature of the transmitter 18 rotates through 360° during a 90° movement of the cell 3. The transmitter 18 is electrically connected with a Selsyn receiver motor 21 which drives the drum 7, through suitable gearing (not shown) and a shaft 22, in synchronism and in phase with the cell 3 so that the drum moves 360° while the cell is moving 90° so that the location, transversely of the sheet 6, of each indication or trace made on the sheet by the input signal from the cell 3, represents the angular elevation of the cell 3 at the moment the light impulse is received, thereby indicating the altitude of the cloud. As is shown in Fig. 3, the distance between the source 1 and the cell 3 is determined when the apparatus is set up; and by maintaining this distance constant each angular position of the cell always corresponds to the same cloud altitude.

The means shown in Fig. 2 for concomitantly calibrating the record sheet with calibration standard record comprises a commutator 23 mounted on the shaft 22 which carries the drum 7. As the commutator is oscillated in synchronism with the drum 7, pulses of current are transmitted from the negative side of a direct power source through the conductor 24, shaft 22, commutator

23, conductors 16, 8 and 4, and conductor 13 to the positive side of the power source so that calibration marks are made on the sheet 6 at transversely spaced intervals determined by the spacing of the bars of the commutator 22.

To indicate when the record of the signals representing cloud height is received, marks indicating elapsed time are also made on the sheet 6. Thus in Fig. 2 a commutator 26 is mounted on the shaft 27 through which the feed roll 11 is driven by the motor 28 as described heretofore, whereby a pulse is transmitted through the record sheet at recurrent intervals from the negative side of the power source through the conductor 24, shaft 27, commutator 26, conductors 29, 14, 16, electrodes 8 and 4, and conductor 13 and thence to the positive side of the power source.

A typical record sheet 6, as made by the above described apparatus is shown in Fig. 1 in which the broken lines 31 indicate the path traced back and forth across the sheet by the effective point of the helix 8; 32 are the marks made by the signal pulses from the cell 3; 33 are the marks made by the current pulses through commutator 23; and 34 are the marks made by the current pulses through the commutator 26. In Fig. 1 the distance between the rows of marks 33 corresponds to 10°, the distance between opposite ends of the lines 31 corresponding to 90°. The distance between the marks 34 longitudinally of the sheet 6 indicates elapsed intervals of time between the pulses transmitted through the commutator 26. For example, if the commutator has four conducting segments and the shaft 27 makes one revolution per hour, the spacing between the marks 34 would represent fifteen minute intervals. By synchronizing the speed of the motor 28 with that of motors 18 and 21, the marks 34 can be arranged in columnar alignment longitudinally of the sheet.

In the example illustrated in Fig. 1 the marks 32 indicate a cloud ceiling corresponding to an angular elevation of approximately 25°, the received signals continuing approximately 15 minutes and the ceiling lifted somewhat during this interval as indicated by the progressive shift of the marks 32 transversely of the sheet. When measuring wave-lengths or frequencies of radio waves the marks 33 would indicate standard frequencies such as 600 kilocycles, 700 kilocycles or 15.1 megacycles, 15.2 megacycles etc., the marks 32 would indicate the frequency of the signal received from some unknown source, the marks 34 would indicate the frequency of a known standard, and the marks 34 would indicate when the signals were received.

From the foregoing it will be evident that, inasmuch as the marks 32 made by the unknown signals are formed concomitantly with the marks 33 of known value, the two sets of marks always bear the proper relationship to each other notwithstanding shrinkage or expansion of the sheet. For most purposes it is preferable to have the standard indications spaced uniformly across the sheet, but in some cases it may be desirable to use some other spacing. For example, if the ceilometer chart shown in Fig. 1 were calibrated in terms of ceiling height in feet instead of degrees of angular movement of the cell, and the rows of marks 33 indicating 100 feet, 200 feet, etc., it would be necessary to space the rows 33 unequally or to change the spacing of the commutator to compensate for the difference in angular movement of the cell for successive hundreds of feet of elevation.

Figure 4:
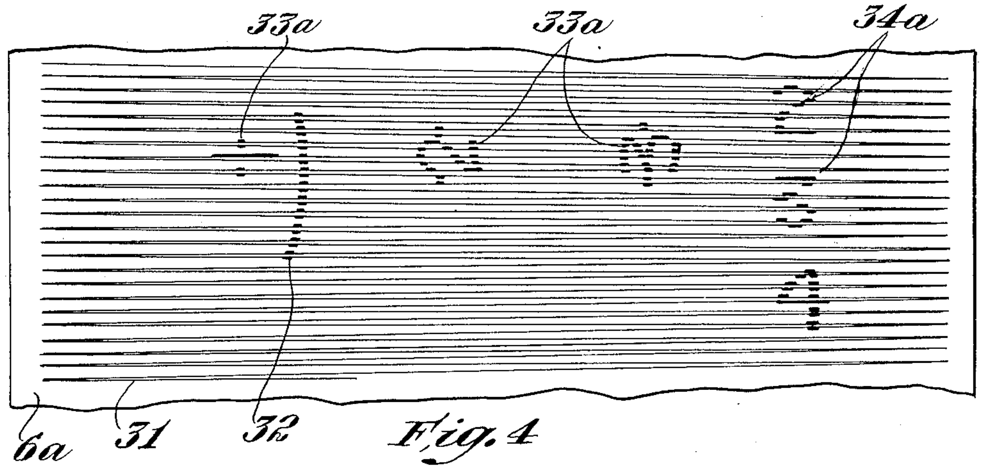
Fig. 4 is a face view of a record sheet showing the record of variations of an input signal and calibration and timing records applied thereupon as ordinals.

In Fig. 4 is shown a portion of a sheet or web of electrosensitive paper **6*a* bearing a record of an input signal 32 representing again for example the height of a cloud ceiling similar to the record bearing the same indicia upon the sheet 6 as shown in Fig. 1. Whereas the sheet 6 has calibration and timing records thereupon in the form of marks 33 and 34 respectively, sheet 6*a* has applied thereto ordinals 33*a* which represent respectively the calibration in hundreds of feet and further ordinals 34a** which represent the time in hourly intervals.

Figure 5:
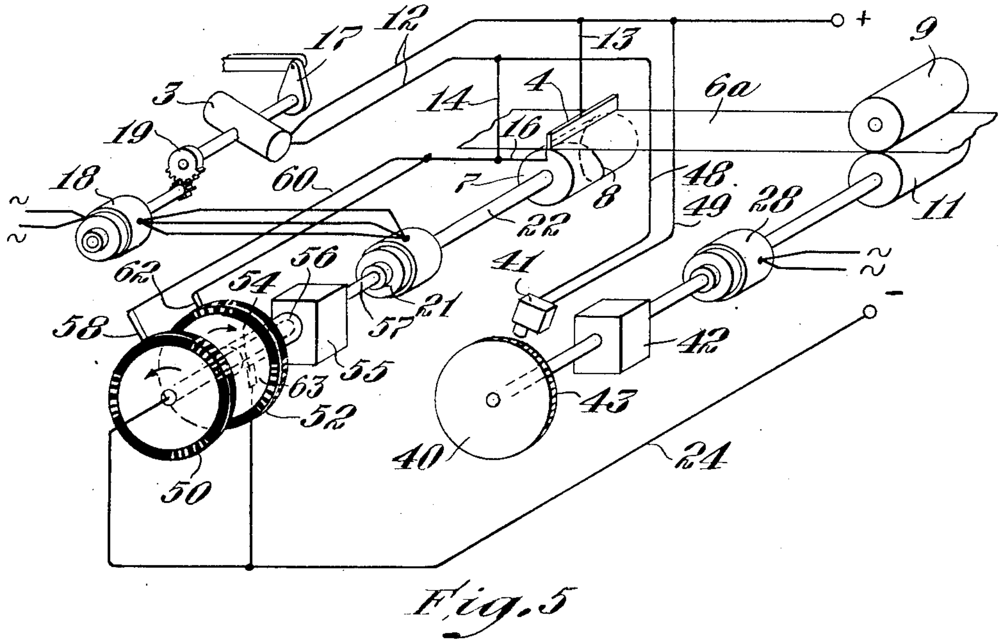
Fig. 5 is a diagrammatic view showing the wiring of the apparatus for applying the records to the sheet shown in Fig. 4.

The apparatus for applying the records 32, 33a and 34a shown upon the web 6a is diagrammatically illustrated in Fig. 5. The photocell 3, the recorder elements and associated equipment are counterparts of those described heretofore in connection with the apparatus shown in Fig. 2 and function in an analogous manner to receive a primary signal such as the reflected light from a cloud and transform such signal into current pulses which are recorded upon the web as the marks 32. As mentioned above the supplementary time record is applied to the web 6a as ordinal numbers 34a rather than as a series of calibrating marks 34 as was the case with respect to the web 6 (Fig. 2). To this end the motor 28 drives a current switching mechanism such as the disc 40 through a speed reducing unit 42. Painted or otherwise applied to the periphery of the disc 40 are a series of marks 43 in black or other contrasting color. Mounted adjacent the disc 40 is a photoelectric cell 41 which is arranged to receive light reflected from the disc periphery. As the disc 40 is rotated the marks 43 vary the light received by the cell 41 which varies the electrical resistance thereof. The associated amplifier (not shown) is arranged so that a pulse of current is transmitted through conductors 48 and 49 to the electrodes 4 and 8 of the recorder whenever a black mark 43 reduces the amount of reflected light received by the cell thereby to leave a record upon the web 6a.

From the foregoing it will be evident that, if the speed of the motor 28 is synchronized with the rate of reciprocation of the motors 18 and 21 (for example by operating the crank 17 by means of a synchronous motor connected to the same alternating power source as the motor 28); and if the black marks are of suitable width and spacing, a pulse of current will be sent to the electrodes 4 and 8 as the recording point thereof approaches the right hand end of the second trace 31 from the top portion of the web 6a thereby to make a mark corresponding to the top portion of the time ordinal "2." Upon the return stroke two adjacent black marks 43 cause the cell 41 to send two pulses of current to the electrodes 4 and 8 thereby to make two additional marks immediately below and on either side of the first mark. The remainder of the ordinal "2" is outlined by applying current pulses at a suitable point during successive traces 31. The ordinals "3" and "4" are made in a similar manner, the space therebetween being obtained by a comparatively long "white" or reflecting portion of the periphery of the disc 40.

The calibrating ordinals 33a are recorded by a different type of switching mechanism although it is to be understood that the above described photoelectric pickup or any other switching arrangement whether magnetic, electronic, mechanic or electrical which will give current pulses of the required duration and spacing may be used. Because of the reciprocating movement of the motor 21 it is advantageous to use two discs 50 and 52 carried upon the coaxially arranged output shafts 54 and 56 respectively of a speed reducing unit 55 which is driven by the drum motor 21 through an input shaft 57. The discs 50 and 52 are commutators having arranged about their peripheries a plurality of conducting segments of varying width which are connected to the negative terminal of a direct power source through their respective shafts and the conductor 24.

The speed reduction unit includes two pawl and ratchet arrangements or mechanically equivalent devices associated respectively with the shafts 54 and 56 whereby as the input shaft 57 is rotated in a clockwise direction, the commutator 52 remains stationary and the commutator 50 is rotated in a counterclockwise direction so that a brush 58 comes into contact with successive conducting segments whereby a circuit is completed from the negative terminal of the power source through the conductor 24, the commutator 50, the brush 58, a conductor 60, the recorder electrodes 8 and 4, and the conductor 13 to the positive power source terminal. The completion of the above circuit causes a current to flow through the sheet of electrosensitive paper 6a interposed between the electrodes 4 and 8 thereby to cause a chemical change which leaves a visible trace or mark. Conversely upon the rotation of the input shaft 57 in a counterclockwise direction, the commutator 50 remains stationary and the commutator 52 is rotated in a clockwise direction so that successive segments thereof complete a circuit connecting the recorder electrodes 4 and 8 to the power source by means of brushes 62 and 63. From the foregoing it will be evident that as the helix 8 is rotated to make a trace 31 across the web 6a from left to right, the commutator 50 is rotated to make the marks upon such trace to outline the ordinals "1," "2" and "3," and upon the reverse rotation of the helix 8 to make the succeeding trace from right to left, the commutator 52 makes the succeeding outlining marks.

Figures 6, 7, 8:
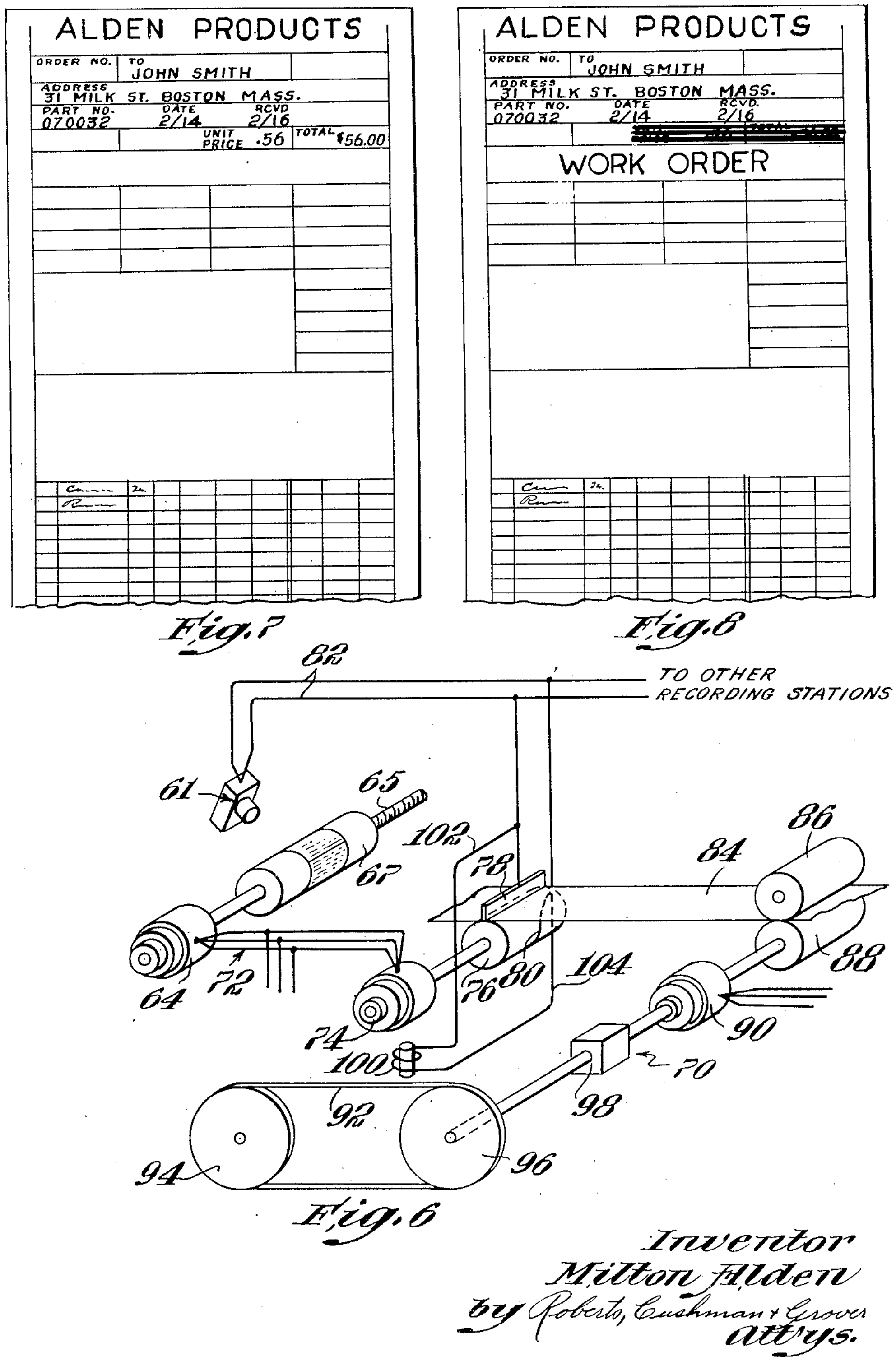
Fig. 6 is a diagrammatic view showing the wiring of apparatus for reproducing records such as business forms.
Fig. 7 is a face view of a form as it is fed to the apparatus shown in Fig. 6.
Fig. 8 is a face view of the record of the form shown in Fig. 6 as it is received from the apparatus shown in Fig. 7.

The principles upon which the above discussed recording instruments operate are also applicable to facsimile communication apparatus and facsimile duplicators. For example, there are diagrammatically shown in Fig. 6, the essential elements of a production control system for a manufacturing organization whereby an original order form prepared in the office by means of a typewriter or in long hand is duplicated at various work and control stations and the shipping and customers' copies thereof made simultaneously. In Fig. 6, the numeral 61 designates the scanning head of a conventional facsimile transmitter having a drum 67 driven by a synchronous motor 64 and carried upon a lead screw 65 so that a spiral motion is imparted thereto with respect to the scanning head. This transmitter is electrically interconnected with one or more receiving stations such as is shown at 70, the other stations being generally similar in design and located at different places either in the same or other plants. Such interconnection is made by conductors 72 which may be the lines of a conventional commercial alternating power system from which both the drive motor 64 for the drum 67 of the transmitter and a synchronous motor 74 driving a drum 76 of the receiver 70 are energized so that the drums rotate in synchronism. The scanning head 61 is connected with a bar electrode 78 and a helical electrode 80 mounted upon the drum 76 by means of conductors 82. A continuous web or sheet 84 of electrosensitive paper is fed between the electrodes by means of feed rolls 86 and 88 which are driven by a motor 90.

It will be evident to a person skilled in the art that when an order form such as shown in Fig. 7 is placed upon the transmitting drum 67 and scanned by the head 61 it will be duplicated upon the electrosensitive paper 84 at the receiving station 70 and all other similar receiving stations connected with the transmitter. For some purposes such duplication is satisfactory, but there are many cases where other information must be added or deleted to obtain the desired copy. For example, the confirmation copy of the form sent to the customer should have information concerning the unit and total prices thereupon while information as to manufacturing methods and costs should be deleted whereas work order and follow up copies will require the latter information and the information as to selling price may be deleted as a matter of policy.

To this end, such information as is required or omitted can be added or deleted at the various receiving stations by providing a switching mechanism having a "memory." In the receiving station 70 such switching mechanism is a magnetic tape 92 although it is to be understood that the previously described photoelectric or mechanical devices or their equivalents can be used in place thereof. The tape 92 is shown schematically as running over two pulleys 94 and 96. The pulley 96 is driven by the paper feed motor 90 through a speed reducing unit 98, the motor in this case being operated in synchronism with the drum motors 64 and 74. Signals due to the varying residual magnetism of the tape 92 are picked up in the well known manner by a transducer 100 and impressed upon the recorder electrodes 78 and 80 as current pulses sent through conductors 102 and 104. By providing the proper pattern of residual magnetism in the tape 92, it is possible to correlate the current pulses to the movement of the paper 84 and the helix 80 to add information to the copy being received in a manner similar to that in which the commutators described above added calibrating and time records to ceilometer records shown in Fig. 4.

For example if it is assumed that station 70 is the station located in the factory to receive work orders such as the one illustrated in Fig. 8, it is necessary for the magnetic tape to be arranged so that it prints "Work orders" and overlays the price marking upon a copy sent from a master form such as that shown in Fig. 7. Other stations in strategic locations will similarly make internal copies such as a Bill of Materials, an Expeditor's Copy, a Shop Order and whatever additional copies are needed for the particular production control system being used, whatever additional information required in each case being added or deleted locally by means of a suitable switching arrangement such as that described above.

The copies of the papers required for the commercial, sales and accounting departments can be prepared simultaneously by additional receiving stations. In this connection it should be noted that other machines such as billing machines, calculators and computors can be combined with the above described "memory" devices. For example, as the number of units and price per unit are printed upon the form, such information can be simultaneously fed to a calculator and the total price computed thereby being stored and subsequently printed upon appropriate copies.

It should be understood that the present disclosure is for the purpose of illustration only and that this invention includes all modifications and equivalents which fall within the scope of the appended claims.

I claim:

1. In the art of recording data on a record sheet, apparatus comprising a recorder including marking means having an effective point responsive to electrical signals, mechanism for feeding the record sheet past the marking means, and movable means for transposing the effective point of the recorder along successive lines extending transversely of the moving sheet, a power source connected to the marking means for recurrently impressing electrical signals thereupon as a comparative standard, and an input signal source synchronized with said movable means and connected to the marking means for transmitting to the effective point of the said recorder an electrical signal which is a function of an unknown variant.

2. In the art of recording data on a record sheet, apparatus comprising a recorder including a drum having a helical conductor superimposed upon the surface thereof, a printer bar juxtaposed said conductor to form an effective marking point responsive to electrical signals, mechanism for feeding a record sheet between said drum and said bar, and oscillating means for transposing the effective point of the recorder along successive lines extending transversely of the moving sheet, a power source connected between said conductor and said bar for recurrently impressing electrical signals thereupon as a comparative standard, and an input signal source synchronized with said oscillating means and connected between said conductor and said bar for transmitting to the effective marking point of the said recorder an electrical signal which is a function of an unknown variant.

3. In the art of recording data on a record sheet, apparatus comprising a recorder including a drum having a helical conductor superimposed upon the surface thereof, a printer bar juxtaposed said conductor to form an effective marking point responsive to electrical signals, mechanism for feeding a record sheet between said drum and said bar, and oscillating means for transposing the effective point of the recorder along successive lines extending transversely of the moving sheet, a commutator moved by said oscillating means, a direct power source arranged for intermittent connection with said conductor and said bar for recurrently impressing electrical signals thereupon as a comparative standard, and an input signal source synchronized with said oscillating means and connected between said conductor and said bar for transmitting to the effective marking point of said recorder an electrical signal which is a function of an unknown variant, the position on the sheet of the indications representative of the unknown variant relative to the position of the indications representative of the comparative standard being an indication of the relative magnitude of the unknown variant.

4. Apparatus for measuring and recording the height of cloud ceilings on a record sheet comprising a recorder including a drum having a helical conductor superimposed upon the surface thereof, a printer bar juxtaposed said conductor to form an effective marking point responsive to electrical signals, mechanism for feeding a record sheet between said drum and said bar, and an electric motor for rotary oscillating said drum to transpose the marking point along successive lines extending transversely of the moving sheet; a commutator oscillated by said motor in synchronism with said drum; a direct power source arranged for intermittent connection by said commutator to said bar and said conductor to impress, as a comparative standard, upon the effective marking point electrical signals representing known angular variations; an input signal source including a source of electromagnetic radiation directing a beam against a cloud ceiling, receiving means which can be oriented to receive radiation reflected from said cloud ceiling, driving means for oscillating said receiving means, a transmitter operated by said driving means and connected to said motor so that said drum and said receiving means rotatably oscillate synchronously; and connections including amplifying means linking said receiving means with said drum and said bar for transmitting to the effective marking point of said recorder an electrical signal representing the relative position of said receiving means and being a function of the orientation of the radiation reflected from said cloud ceiling whereby the relative position of the indications resulting from signals from said commutator and from said receiving means respectively is a function of the height of the cloud ceiling.

5. Recording apparatus comprising a recorder including two electrodes and a mechanism for feeding recording paper therebetween, driving means for moving one electrode with respect to the other electrode to transpose the effective marking point along successive lines extending transversely of the movement of the paper to form a time ordinate, an input signal source for applying to said electrodes a first potential whose amplitude is varied as a function of time, and a second input signal source for superimposing upon said electrodes a second potential whose amplitude is varied as a function of time, the relative positions of the resulting marks upon the recording paper being determined by the relative movement of the electrodes whereby the signals from the respective sources can be distinguished.

6. Recording apparatus comprising a recorder including two electrodes and feeding means for moving recording paper therebetween, driving means for moving one electrode with respect to the other electrode to transpose the effective marking point along successive lines extending transversely of the movement of the paper to form a time ordinate, an input signal source including transmitting means synchronized with the one of said means and connected to the electrodes to impress a potential therebetween whose amplitude is varied as a function of time, and a second input signal source for superimposing upon said electrodes a second potential whose amplitude is varied as a function of time, the relative positions of the resulting marks upon the recording paper being determined by the relative movement of the electrodes whereby the signals from the respective sources can be distinguished.

7. Recording apparatus comprising a recorder including two electrodes and mechanism for feeding recording paper therebetween, driving means for moving one electrode with respect to the other electrode to transpose the effective marking point along successive lines extending transversely of the movement of the paper to form a time ordinate, an input signal source including transmitting means synchronized with the driving means and connected to the electrodes to impress a potential therebetween whose amplitude is varied as a function of time, and a second input signal source for superimposing upon said electrodes a second potential whose amplitude is varied as a function of time, the relative positions of the resulting marks upon the recording paper being determined by the relative movement of the electrodes whereby the signals from the respective sources can be distinguished.

8. Recording apparatus comprising a recorder including two electrodes and mechanism for feeding recording paper therebetween, driving means for moving one electrode with respect to the other electrode to transpose the effective marking point along successive lines extending transversely of the movement of the paper to form a time ordinate, an input signal source connected to said electrodes for applying thereto a potential whose amplitude is varied as a function of time, and a second input signal source including transmitting means synchronized with the feeding mechanism and connected to said electrodes to superimpose thereupon a second potential whose amplitude is varied as a function of time, the relative positions of the resulting marks upon the recording paper being determined by the relative movement of the electrodes whereby the signals from the respective sources can be distinguished.

9. Recording apparatus comprising a recorder including two adjacently disposed electrodes and mechanism for feeding electrosensitive paper between the electrodes, one of the electrodes having a substantially straight edge disposed transversely to the direction in which the paper is fed, the other electrode being helical shaped, driving means for rotating the helical electrode about the axis of the helix to transpose the effective marking point along successive lines extending transversely of the movement of the paper to form a time ordinate, an input signal source including transmitting means synchronized with the driving means and connected to the electrodes to impress a potential therebetween whose amplitude is varied as a function of time, and a second input signal source for superimposing upon said electrodes a second potential whose amplitude is varied as a function of time, the relative positions of the resulting marks upon the recording paper being determined by the relative movement of the electrodes whereby the signals from the respective sources can be distinguished.

10. Recording apparatus comprising a recorder including two adjacently disposed electrodes and mechanism for feeding electrosensitive paper between the electrodes, one of the electrodes having a substantially straight edge disposed transversely to the direction in which the paper is fed, the other electrode being helical shaped, driving means for rotating the helical electrode about the axis of the helix to transpose the effective marking point along successive lines extending transversely of the movement of the paper to form a time ordinate, an input signal connected to said electrodes for applying thereto a potential whose amplitude is varied as a function of time, and a second input signal source including transmitting means synchronized with the feeding mechanism and connected to said electrodes to superimpose thereupon a second potential whose amplitude is varied as a function of time, the relative positions of the resulting marks upon the recording paper being determined by the relative movement of the electrodes whereby the signals from the respective sources can be distinguished.

11. Recording apparatus comprising a recorder including two electrodes and mechanism for feeding recording paper therebetween, driving means for moving one electrode with respect to the other electrode to transpose the effective marking point along successive lines extending transversely of the movement of the paper to form a time ordinate, an input signal source including transmitting means synchronized with the driving means and connected to the electrodes to impress a potential therebetween whose amplitude is varied as a function of time, and a second source of input signals connected to the electrodes for superimposing upon said electrodes a second potential whose amplitude is varied as a function of time, the relative positions of the resulting marks upon the recording paper being determined by the relative movement of the electrodes whereby the signals from the respective sources can be distinguished.

12. Recording apparatus comprising a recorder including two electrodes and mechanism for feeding recording paper therebetween, driving means for moving one electrode with respect to the other electrode to transpose the effective marking point along successive lines extending transversely of the movement of the paper to form a time ordinate, an input signal source connected to the electrodes to impress a potential therebetween whose amplitude is varied as a function of time, and a second source of input signals including feeding means synchronized with the feeding mechanism and connected to the electrodes for superimposing upon said electrodes a second potential whose amplitude is varied as a function of time, the relative positions of the resulting marks upon the recording paper being determined by the relative movement of the electrodes whereby the signals from the respective sources can be distinguished.

13. Recording apparatus comprising a recorder including two adjacently disposed electrodes and mechanism for feeding electrosensitive paper between the electrodes, one of the electrodes having a substantially straight edge disposed transversely to the direction in which the paper is fed, the other electrode being helical shaped, driving means for rotating the helical electrode about the axis of the helix to transpose the effective marking point along successive lines extending transversely of the movement of the paper to form a time ordinate, an input signal source connected to the electrodes to impress a potential therebetween whose amplitude is varied as a function of time, and a second source of input signals including switching means operated in a selected timed relationship with respect to the driving means and connected to the electrodes for superimposing upon said electrodes a second potential whose amplitude is varied as a function of time, the relative positions of the resulting marks upon the recording paper being determined by the relative movement of the electrodes whereby the signals from the respective sources can be distinguished.

14. Recording apparatus comprising a recorder including two adjacently disposed electrodes and mechanism for feeding electrosensitive paper between the electrodes, one of the electrodes having a substantially straight edge disposed transversely to the direction in which the paper is fed, the other electrode being helical shaped, driving means for rotating the helical electrode about the axis of the helix to transpose the effective marking point along successive lines extending transversely of the movement of the paper to form a time ordinate, an input signal source including switching means operated in a selected timed relationship with respect to the feeding mechanism and connected to the electrodes to impress a potential therebetween whose amplitude is varied as a function of time, and a second source of input signals connected to the electrodes for superimposing upon said electrodes a second potential whose amplitude is varied as a function of time, the relative positions of the resulting marks upon the recording paper being determined by the relative movement of the electrodes whereby the signals from the respective sources can be distinguished.

15. In the art of recording data on a record sheet, apparatus comprising a recorder including marking means having an effective point responsive to electrical signals, mechanism for feeding the record sheet past the marking means, and movable means for continuously transposing the effective point of the recorder along successive lines extending transversely of the direction of movement of the sheet; an input signal source synchronized with said movable means and connected to the marking means for transmitting to the effective point of the said recorder an electrical signal whose variations are a function of the unknown variations of a physical quantity; and a power source connected to said marking means for recurrently impressing thereupon, as a comparative standard, electrical signals which vary as a function of known variations of said quantity.

16. In the art of recording data on a record sheet, apparatus comprising a recorder including a drum having a helical conductor superimposed upon the surface thereof, a printer bar juxtaposed said conductor to form an effective marking point responsive to electrical signals, mechanism for feeding a record sheet between said drum and said bar, and oscillating means for continuously transposing the effective point of the recorder along successive lines extending transversely of the direction of movement of the sheet; an input signal source synchronized with said oscillating means and connected between said conductor and said bar for transmitting to the effective marking point of the said recorder an electrical signal whose variations are a function of the unknown variations of a physical quantity; and a power source connected to said marking means for recurrently impressing thereupon, as a comparative standard, electrical signals which vary as a function of known variations of said quantity.

17. In the art of recording data on a record sheet, apparatus comprising a recorder including a drum having a helical conductor superimposed upon the surface thereof, a printer bar juxtaposed said conductor to form an effective marking point responsive to electrical signals, mechanism for feeding a record sheet between said drum and said bar, and oscillating means for continuously transposing the effective point of the recorder along successive lines extending transversely of the direction of movement of the sheet; a commutator moved by said oscillating means; a direct power source arranged for intermittent connection by said commutator with said conductor and said bar for recurrently impressing thereupon, as a comparative standard, electrical signals which vary as a function of known variations of a physical quantity; and an input signal source synchronized with said oscillating means and connected between said conductor and said bar for transmitting to the effective marking point of said recorder an electrical signal whose variations are a function of the unknown variations of said quantity, the position of the sheet of the indications representative of the unknown variations with respect to the position of the indications representative of the known variations being a measure of the magnitude of the physical quantity.

18. Apparatus for measuring and recording the height of cloud ceilings on a record sheet comprising a recorder including a drum having a helical conductor superimposed upon the surface thereof, a printer bar juxtaposed said conductor to form an effective marking point responsive to electrical signals, mechanism for feeding a record sheet between said drum and said bar, and an electric motor for rotatably oscillating said drum continuously to transpose the marking point along successive lines extending transversely of the direction of movement of the sheet; a commutator oscillated by said motor in synchronism with said drum; a direct power source arranged for intermittent connection by said commutator to said bar and said conductor to impress recurrently thereupon, as a comparative standard, electrical signals which vary as a function of known angular variations; an input signal source including a light source directing a vertical beam against a cloud ceiling, a photoelectric cell rotatable in a vertical plane including said light beam whereby said cell can be oriented to receive light reflected from said cloud ceiling, driving means for oscillating said cell in said plane, and a transmitter operated by said driving means and connected to said motor so that said drum and said cell rotatably oscillate synchronously; and connections including amplifying means linking said cell with said drum and said bar for transmitting to the effective marking point of said recorder an electrical signal which varies as a function of the angle of said cell and is a function of the orientation of the light reflected from said beam; whereby the relative position of the indications resulting from signals from said commutator and from said cell respectively is a function of the height of the cloud ceiling.

19. In the art of recording on a moving web a plurality of signals representing different items of information having a predetermined relation, the method which comprises feeding the web in a given direction, scanning the web transversely of said direction in recurring cycles, marking the web with a primary record representing information according to one of said signals during each transverse scanning, marking the web with a secondary record according to signals representing other information so that said records are aligned extending transversely of the direction of web feed, and controlling the marking of said secondary record so that it begins simultaneously with one of said recurring cycles, whereby the respective records are marked in a superposed relation which is the same as the aforesaid predetermined relation of said information regardless of changes in the dimensions or direction of feeding said web.

20. For recording a plurality of types of information on a web, apparatus comprising means for feeding the web in one direction along a predetermined path, a marker for recording on the web, means causing said marker to scan the web transversely of the path of the web in recurrent cycles, a signal input connected to said marker and operative to actuate the marker during said cycles according to one of said types of information thereby to record said information, a generator producing secondary signals representing another piece of information having a predetermined relation to the first said information, connections for transmitting said secondary signals to said marker so as to mark the web during cycles concomitant with the first said signals, and means synchronizing said marker and generator so that the recording of said secondary signals begins simultaneously with one of said marker cycles, whereby the respective records are marked in a superposed relation which is the same as the aforesaid predetermined relation of said information regardless of changes in the dimensions or direction of feeding said web.

21. Apparatus for recording a plurality of related signals on a web comprising means to feed the web in one direction, means to scan successive lines of said web normal to the direction of web feeding during each interval of a succession of regular intervals, said scan means including signal responsive marking means, a source of primary signals variable with respect to each interval, a generator of secondary signals having a predetermined pattern with respect to each interval, means synchronizing said generator with said scan means, and connections between said marking means and said source and generator respectively for concomitantly applying said primary and secondary signals to said marking means, thereby to superimpose said primary signals on said pattern in proper relation despite variation in the dimensions of said paper.

22. Apparatus for recording a plurality of related signals on a web comprising means to feed the web in one direction, means to scan successive transverse lines of said web normal to the direction of web feed during each of a succession of regular intervals, said scan means including signal responsive marking means, a source of primary signals variable with respect to said intervals, a generator of a secondary signal series including a plurality of signal elements having a predetermined pattern with respect to each interval, means synchronizing said generator with said scan means, and connections between said marking means and said source and generator respectively for concomitantly applying said primary and secondary signals to said marking means, thereby to mark each of said series in said predetermined pattern and to superimpose said primary signals on said pattern in proper relation despite variation in the dimensions of said paper.

23. Recording apparatus comprising a recorder including two electrodes and a mechanism for feeding recording paper therebetween, driving means for moving one electrode with respect to the other electrode to transpose the effective marking point during successive intervals along successive lines extending transversely of the movement of the paper to form a time ordinate, an input signal source for applying to said electrodes a first potential variable during said successive intervals, means for superimposing on said electrodes a second potential having a predetermined pattern during a plurality of said intervals, and means synchronizing said superimposing means with said first potential thereby to record said first and second potentials in a predetermined time relation.

24. Apparatus for recording a plurality of signals on a web comprising means to feed the web in one direction, means to scan successive transverse lines of said web normal to the direction of web feed during each of a succession of regular intervals, said scan means including signal responsive marking means, a facsimile copy scanner for producing facsimile signals corresponding to the copy, means for transmitting said facsimile signals to said marking means, a generator of secondary signals having a relation to said facsimile copy, means for transmitting said secondary signals to said marking means thereby to mark said facsimile signals and said secondary signals concomitantly on said web, and means for synchronizing said facsimile scanner and said generator with said scan means, whereby a record of said secondary signals is superimposed on a facsimile record of said copy in correct relation thereto.

References Cited in the file of this patent

UNITED STATES PATENTS

| | | |
|---|---|---|
| 1,909,142 | Zworykin | Jan. 14, 1933 |
| 2,228,883 | Morgan | Jan. 14, 1941 |
| 2,354,923 | McNamee | Jan. 7, 1941 |
| 2,390,364 | Gibbs | Dec. 4, 1945 |
| 2,400,828 | Keinath | May 21, 1946 |
| 2,430,780 | Peterson | Nov. 11, 1947 |
| 2,467,202 | Gardiner | Apr. 12, 1949 |
| 2,481,034 | Neufeld | Sept. 6, 1949 |
| 2,489,253 | Andre | Nov. 29, 1949 |
| 2,500,746 | Ellenberger | Mar. 14, 1950 |
| 2,504,126 | Howe | Apr. 18, 1950 |
| 2,510,923 | Brastad et al. | June 6, 1950 |
| 2,540,081 | Alden | Feb. 6, 1951 |
| 2,570,500 | Smith | Oct. 9, 1951 |
| 2,651,752 | Devot | Sept. 8, 1953 |